(12) United States Patent
Nagatani et al.

(10) Patent No.: US 9,499,655 B2
(45) Date of Patent: Nov. 22, 2016

(54) POLYURETHANE RESIN FOR MOISTURE-PERMEABLE WATER-PROOF MATERIALS, AND POLYURETHANE RESIN COMPOSITION

(71) Applicant: Sanyo Chemical Industries, Ltd., Kyoto (JP)

(72) Inventors: Yoshihiro Nagatani, Kyoto (JP); Tomomi Yokoi, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 0 days.

(21) Appl. No.: 14/935,707

(22) Filed: Nov. 9, 2015

(65) Prior Publication Data
US 2016/0060381 A1    Mar. 3, 2016

Related U.S. Application Data

(62) Division of application No. 14/125,711, filed as application No. PCT/JP2012/065785 on Jun. 20, 2012, now Pat. No. 9,212,249.

(30) Foreign Application Priority Data

Jul. 8, 2011 (JP) .................................. 2011-151609
Aug. 12, 2011 (JP) .................................. 2011-177313

(51) Int. Cl.
C08G 18/48 (2006.01)
C08G 18/30 (2006.01)
(Continued)

(52) U.S. Cl.
CPC ....... *C08G 18/4804* (2013.01); *C08G 18/0823* (2013.01); *C08G 18/345* (2013.01);
(Continued)

(58) Field of Classification Search
None
See application file for complete search history.

(56) References Cited

U.S. PATENT DOCUMENTS 3,687,715 A     8/1972  Kigane et al.
4,083,815 A  *  4/1978  Thompson ........... C08G 18/671
                                                        524/290
5,075,408 A    12/1991  Suzuki et al.

FOREIGN PATENT DOCUMENTS

EP    1 074 569    2/2001
EP    1 702 941    9/2006
(Continued)

OTHER PUBLICATIONS

JP2007-191628 English machine translation Jan. 1, 2015.*

(Continued)

*Primary Examiner* — Randy Gulakowski
*Assistant Examiner* — Christopher M Rodd
(74) *Attorney, Agent, or Firm* — Wenderoth, Lind & Ponack, L.L.P.

(57) ABSTRACT

The present invention aims to provide a polyurethane resin for moisture-permeable waterproof materials which is excellent in all of the moisture permeability, waterproofness, and resistance to washing. The polyurethane resin for moisture-permeable waterproof materials according to the present invention is a polyurethane resin for moisture-permeable waterproof materials, obtainable by reacting an active hydrogen component (A1) with an organic polyisocyanate component (B), wherein the active hydrogen component (A1) includes
an oxyethylene group-containing high molecular weight diol (a1), and
a compound (S1) containing at least one active hydrogen atom and being represented by the following formula (1):

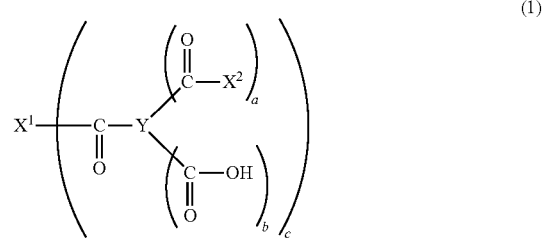

(1)

wherein $X^1$ represents a residue produced by removing c piece (s) of active hydrogen atom(s) from an active hydrogen-containing compound having a valence of m, the c representing an integer satisfying the inequality: $1 \leq c \leq m$, the m representing an integer of 1 to 20;

$X^2$ represents a residue produced by removing one piece of active hydrogen atom from an active hydrogen-containing compound, and a plurality of $X^2$s may be the same as or different from one another;

$X^1$ and $X^2$ may be the same as or different from each other;

Y represents a residue produced by removing all of carboxyl groups from an aromatic polycarboxylic acid having a valence of 3 or more, wherein an aromatic ring in Y consists of carbon atoms, the carbon atoms are each optionally bound to a halogen atom and/or a substituent other than a carboxyl group, and at least one of the carbon atoms has no substituent;

a represents an integer of not smaller than 1;

b represents an integer of not smaller than 0; and a and b satisfy the inequality: $2 \leq a+b \leq d-2$, wherein d represents the number of hydrogen atoms bound to the carbon atoms forming the aromatic ring of the aromatic polycarboxylic acid when all of substituents including a carboxyl group in the aromatic polycarboxylic acid are substituted by hydrogen atoms, i.e., the number of substitutable sites on the aromatic ring.

10 Claims, No Drawings

(51) Int. Cl.
*C08G 18/34* (2006.01)
*C08G 18/76* (2006.01)
*C08G 75/08* (2006.01)
*C08G 18/08* (2006.01)
*C08L 75/08* (2006.01)
*C08G 18/40* (2006.01)
*C08G 18/42* (2006.01)
*C08G 18/46* (2006.01)
*C09J 175/04* (2006.01)
*D06M 15/564* (2006.01)

(52) U.S. Cl.
CPC ....... *C08G18/4018* (2013.01); *C08G 18/4261* (2013.01); *C08G 18/4676* (2013.01); *C08G 18/4833* (2013.01); *C08G 18/4887* (2013.01); *C08G 18/7671* (2013.01); *C08L 75/08* (2013.01); *C09J 175/04* (2013.01); *D06M 15/564* (2013.01); *C08G 2170/90* (2013.01); *C08G 2190/00* (2013.01)

(56) References Cited

FOREIGN PATENT DOCUMENTS

| | | |
|---|---|---|
| JP | 54-961 | 1/1979 |
| JP | 56-26076 | 3/1981 |
| JP | 64-62320 | 3/1989 |
| JP | 4-180813 | 6/1992 |
| JP | 8-311183 | 11/1996 |
| JP | 2007-191628 | 8/2007 |
| JP | 2007191628 A * | 8/2007 |
| JP | 2011-63749 | 3/2011 |
| JP | 2012-89222 | 5/2012 |
| WO | 2011/152036 | 12/2011 |

OTHER PUBLICATIONS

International Search Report issued Sep. 18, 2012 in International (PCT) Application No. PCT/JP2012/065785.

JP2007-191628 English language machine translation with a publication date of Aug. 2007.

\* cited by examiner

POLYURETHANE RESIN FOR MOISTURE-PERMEABLE WATER-PROOF MATERIALS, AND POLYURETHANE RESIN COMPOSITION

TECHNICAL FIELD

The present invention relates to a polyurethane resin. Specifically, the present invention relates to a polyurethane resin that is suitably used for moisture-permeable waterproof materials.

BACKGROUND ART

Microporous sheets have been conventionally used as moisture-permeable materials for moisture-permeable waterproof fabrics. Known examples of such microporous sheets are those formed by stretching a polytetrafluoroethylene resin to form a porous sheet or polyurethane resin films produced by wet film formation technique (see, for example, Patent Literature 1). Unfortunately, conventional porous sheets reduce the moisture permeability due to clogging with sweat, dirt, or other substances, or fail to exhibit sufficient waterproofness.

In order to overcome those disadvantages, non-porous sheets coated with hydrophilic moisture-permeable polyurethane resins have been proposed (see, for example, Patent Literatures 2 to 4). These moisture-permeable polyurethane resins contain polyol components such as polyoxyethylene glycol, which is a hydrophilic segment, and block copolymers of polyoxyethylene and polyoxypropylene.

Those non-porous sheets have a dramatically higher moisture permeability when they are coated with a thinner polyurethane resin film. However, those sheets have low strength due to low strength of resin and fail to exhibit sufficient waterproofness. Moreover, since the resin has a high permanent set, those sheets have insufficient resistance to washing exemplified by plastic deformation of resin resulting in wrinkles after washing.

CITATION LIST

Patent Literature

Patent Literature 1: JP-A S59-15825
Patent Literature 2: JP-B S54-961
Patent Literature 3: JP-A S64-62320
Patent Literature 4: JP-A H04-180813

SUMMARY OF INVENTION

Technical Problem

The present invention has been made in consideration of the above disadvantages, and aims to provide a polyurethane resin for moisture-permeable waterproof materials excellent in all of the moisture-permeability, waterproofness, and resistance to washing.

Solution to Problem

As a result of intensive studies to overcome the above disadvantages, the inventors of the present invention completed the present invention. The present invention provides a polyurethane resin (U) for moisture-permeable waterproof materials, obtainable by reacting an active hydrogen component (A1) with an organic polyisocyanate component (B), wherein the active hydrogen component (A1) includes an oxyethylene group-containing high molecular weight diol (a1), and a compound (S1) containing at least one active hydrogen atom and being represented by the following formula (1); and also provides a polyurethane resin composition (W) for moisture-permeable waterproof materials, including a polyurethane resin, and a compound (S), the polyurethane resin being obtainable by reacting an active hydrogen component (A2) that comprises an oxyethylene group-containing high molecular weight diol (a1) other than the compound (S) with an organic polyisocyanate component (B), the compound (S) being represented by the following formula (1).

[Chem. 1]

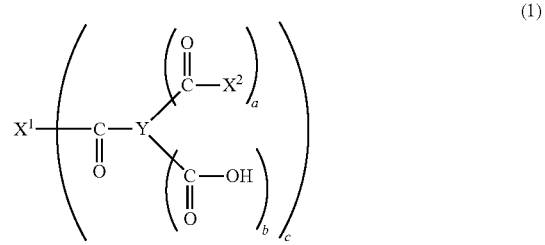

In the formula (I), $X^1$ represents a residue produced by removing c piece (s) of active hydrogen atom(s) from an active hydrogen-containing compound having a valence of m, the c representing an integer satisfying the inequality: $1 \leq c \leq m$, the m representing an integer of 1 to 20;

$X^2$ represents a residue produced by removing one piece of active hydrogen atom from an active hydrogen-containing compound, and a plurality of $X^2$s may be the same as or different from one another;

$X^1$ and $X^2$ may be the same as or different from each other;

Y represents a residue produced by removing all of carboxyl groups from an aromatic polycarboxylic acid having a valence of 3 or more, wherein an aromatic ring in Y consists of carbon atoms, the carbon atoms are each optionally bound to a halogen atom and/or a substituent other than a carboxyl group, and at least one of the carbon atoms has no substituent;

a represents an integer of not smaller than 1;

b represents an integer of not smaller than 0; and a and b satisfy the inequality: $2 \leq a+b \leq d-2$, wherein d represents the number of hydrogen atoms bound to the carbon atoms forming the aromatic ring of the aromatic polycarboxylic acid when all of substituents including a carboxyl group in the aromatic polycarboxylic acid are substituted by hydrogen atoms, i.e., the number of substitutable sites on the aromatic ring.

Advantageous Effects of Invention

The polyurethane resin of the present invention has not only high hydrophilicity and high resin strength but also low permanent set. Thus, the use of the polyurethane resin of the present invention enables to provide moisture-permeable waterproof materials that are excellent in moisture permeability, waterproofness, and resistance to washing.

DESCRIPTION OF EMBODIMENTS

The polyurethane resin (U) for moisture-permeable waterproof materials according to the present invention is characteristically obtainable by reacting an active hydrogen component (A1) with an organic polyisocyanate component (B), the active hydrogen component (A1) including a compound (S1) containing at least one active hydrogen atom and being represented by the formula (1), and an oxyethylene group-containing high molecular weight diol (a1). The polyurethane resin (U) contains the active hydrogen component (A1) that at least partially includes the compound (S1), so that the compound (S1) is incorporated in the skeleton of the polyurethane resin (U). Thus, the polyurethane resin has the specific effects mentioned above.

The polyurethane resin composition (W) for moisture-permeable waterproof materials according to the present invention includes a polyurethane resin and a compound (S) represented by the formula (1). If a polyurethane resin that does not contain the compound (S1) containing at least one active hydrogen atom and being represented by the formula (1) is mixed with the compound (S) represented by the formula (1), the mixture exerts the same effects as those of the polyurethane resin (U) containing the compound (S1).

Examples of the compound (S) represented by the formula (1) include the compound (S1) containing at least one active hydrogen atom and a compound (S2) containing no active hydrogen atom. The polyurethane resin (U) for moisture-permeable waterproof materials according to the present invention includes the compound (S1) containing at least one active hydrogen atom, among the compounds (S1) and (S2). The polyurethane resin composition (W) for moisture-permeable waterproof materials according to the present invention may include either of the compound (S1) and the compound (S2).

One kind of the compound (S1) may be used alone, or two or more kinds thereof may be used in combination. The same applies to the compound (S2).

The following describes the compound (S) represented by the formula (1). The compositions, numeric values, and other items and ranges thereof mentioned as preferable for the compound (S) are the same in both of the compound (S1) containing at least one active hydrogen atom to be contained in the polyurethane resin (U) and the compound (S) to be contained in the polyurethane resin composition (W), unless otherwise stated.

[Chem. 2]

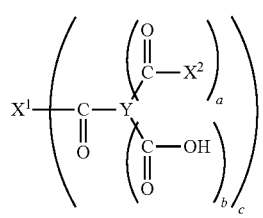

(1)

In the formula (1), $X^1$ represents a residue produced by removing c piece(s) of active hydrogen atom(s) from an active hydrogen-containing compound having a valence of m.

Examples of the active hydrogen-containing compound include hydroxy group-containing compounds, ammonia, amino group-containing compounds, and thiol group-containing compounds. One kind of the active hydrogen-containing compound may be used alone, or two or more kinds thereof may be used in combination.

Examples of the hydroxy group-containing compounds include $C_1$-$C_{20}$ monohydric alcohols, $C_2$-$C_{20}$ polyhydric alcohols, phenols, and alkylene oxides (hereinafter abbreviated as AO) adducts thereof.

Examples of the $C_1$-$C_{20}$ monohydric alcohols include $C_1$-$C_{20}$ alkanol (e.g., methanol, ethanol, butanol, octanol, decanol, dodecyl alcohol, myristyl alcohol, cetyl alcohol, and stearyl alcohol), $C_2$-$C_{20}$ alkenol (e.g., oleyl alcohol and linoleyl alcohol), and $C_7$-$C_{20}$ araliphatic alcohol (e.g., benzyl alcohol and naphthyl ethanol).

Examples of the $C_2$-$C_{20}$ polyhydric alcohols include $C_2$-$C_{20}$ dihydric alcohols, such as aliphatic diol (e.g., ethylene glycol, propylene glycol, 1,3- or 1,4-butanediol, 1,6-hexanediol, neopentyl glycol, and 1,10-decanediol), alicyclic diol (e.g., cyclohexanediol and cyclohexanedimethanol), and araliphatic diol (e.g., 1,4-bis(hydroxy ethyl)benzene); $C_3$-$C_{20}$ trihydric alcohols, such as aliphatic triol (e.g., glycerin and trimethylol propane); and $C_5$-$C_{20}$ tetrahydric to octahydric alcohols, such as aliphatic polyol (e.g., pentaerythritol, sorbitol, mannitol, sorbitan, diglycerin, and dipentaerythritol), and saccharides (e.g., sucrose, glucose, mannose, fructose, methyl glucoside, and derivatives thereof).

Examples of the phenols include monohydric phenol (e.g., phenol, 1-hydroxy naphthalene, anthrol, and 1-hydroxy pyrene) and polyhydric phenol (e.g., phloroglucin, pyrogallol, catechol, hydroquinone, bisphenol A, bisphenol F, bisphenol S, 1,3,6,8-tetrahydroxy naphthalene, 1,4,5,8-tetrahydroxy anthracene, condensates (Novolac) of phenol and formaldehyde, and polyphenols described in U.S. Pat. No. 3,265,641.

Examples of the amino group-containing compound include $C_1$-$C_{20}$ monohydrocarbylamine, such as alkylamine (e.g., butyl amine), benzyl amine, and aniline; $C_2$-$C_{20}$ aliphatic polyamine, such as ethylenediamine, 1,6-hexane diamine, and diethylene triamine); $C_6$-$C_{20}$ alicyclic polyamine, such as diamino cyclohexane, dicyclohexyl methanediamine, and isophoronediamine; $C_2$-$C_{20}$ aromatic polyamine, such as phenylene diamine, tolylenediamine, and diphenyl methanediamine; $C_2$-$C_{20}$ heterocyclic polyamine, such as piperazine and N-amino ethyl piperazine; alkanolamines, such as monoethanolamine, diethanolamine, and triethanolamine; polyamidepolyamines obtained by condensation of dicarboxylic acid with an excess polyamine; polyether polyamines; hydrazines (e.g., hydrazine and monoalkyl hydrazines); dihydrazides (e.g., succinic acid dihydrazide and terephthalic acid dihydrazide); guanidines (e.g., butyl guanidine and 1-cyanoguanidine); and dicyandiamide.

Examples of the thiol group-containing compounds include $C_1$-$C_{20}$ monovalent thiol compounds, such as alkane thiol (e.g., ethane thiol), benzene thiol, and phenyl methanethiol; and polythiol compounds, such as 1,2-ethanedithiol and 1,6-hexanedithiol.

A compound having two or more kinds of active hydrogen-containing functional groups (e.g., hydroxy group, amino group, and thiol group) in a molecule thereof may be used as the active hydrogen-containing compound.

Moreover, alkylene oxide (hereinafter abbreviated as AO) adducts of the above-mentioned active hydrogen-containing compound may be used as the active hydrogen-containing compound.

Examples of the AO to be added to the active-hydrogen containing compound include $C_2$-$C_4$ AOs, such as ethylene oxide (hereinafter abbreviated as EO), 1,2-propylene oxide (hereinafter abbreviated as PO), 1,3-propylene oxide, 1,2-, 1,3-, or 2,3-butylene oxide, and tetrahydrofuran (hereinafter abbreviated as THF). Preferable among these are EO, PO and THF from the viewpoint of waterproofness and resistance to washing. One kind of AO may be used alone, or two or more kinds of AOs may be used in combination. A method of adding two or more kinds of AOs may be block addition or random addition, or may be a combination of these methods.

The number of moles of the AO to be added is preferably 8 to 100, and more preferably 10 to 80 from the viewpoint of waterproofness. The hydroxyl value of the AO adduct is preferably 18 to 360 mg KOH/g.

In the present invention, the hydroxyl value is measured in accordance with JIS K-1557-1.

Preferable examples of the active hydrogen-containing compound for introducing $X^1$ into the compound (S) is preferably hydroxy group-containing compounds, amino group-containing compounds, and AO adducts thereof from the viewpoint of waterproofness and resistance to washing. More preferable examples include $C_2$-$C_{20}$ polyhydric alcohols, polyether polyols obtained by adding AO to $C_2$-$C_{20}$ polyhydric alcohols, $C_2$-$C_{20}$ aliphatic polyamines, and polyvalent thiol compounds. Particularly preferable examples include $C_2$-$C_{20}$ polyhydric alcohols and polyether polyols obtained by adding AO to $C_2$-$C_{20}$ polyhydric alcohols. Most preferable examples include polyether polyols obtained by adding AO to $C_2$-$C_{20}$ polyhydric alcohols.

The valence m of the active hydrogen-containing compound is normally 1 to 20, preferably 1 to 8, more preferably 1 to 4, and particularly preferably 2.

In the formula (1), c represents an integer satisfying the inequality: $1 \leq c \leq m$. From the viewpoint of waterproofness and resistance to washing, c is preferably 1 to 8, more preferably 1 to 4, and particularly preferably 2.

In the formula (1), $X^2$ represents a residue produced by removing one piece of active hydrogen atom from an active hydrogen-containing compound having 1 to 20 valences, and a plurality of $X^2$s may be the same as or different from one another.

The active hydrogen-containing compound for forming $X^2$ may be one that is the same or similar to the active hydrogen-containing compound mentioned for the abovementioned $X^1$. $X^2$ and $X^1$ may be the same as or different from each other; however, at least one of $X^2$s is preferably different from $X^1$ from the viewpoint of waterproofness and resistance to washing.

Moreover, the valence of $X^2$ is normally 1 to 20, preferably 1 to 8, l more preferably 1 to 4, particularly preferably 1 to 2, and most preferably 2 from the viewpoint of waterproofness and resistance to washing.

Meanwhile, it is possible to introduce $X^1$ and $X^2$ in the compound (S) by reacting the active hydrogen-containing compound with a polycarboxylic acid having a valence of 3 or more to form the below-mentioned Y. In a specific case where $X^1$ and $X^2$ each are a $C_2$ to $C_4$ diol, or a polyether polyol in which the repetition unit has 2 to 4 carbon atoms, the same or similar compound may also be obtained by adding the $C_2$-$C_4$ AO to the carboxyl group of the polycarboxylic acid.

In the formula (1), Y represents a residue produced by removing all of carboxyl groups from an aromatic polycarboxylic acid having a valence of 3 or more. An aromatic ring in Y consists of carbon atoms. The carbon atoms are each optionally bound to a halogen atom and/or a substituent other than a carboxyl group. Here, at least one of the carbon atoms has no substituent and is bound to a hydrogen atom.

Examples of the substituent other than a carboxyl group include alkyl, vinyl, allyl, cyclo alkyl, amino, hydroxyl, hydroxy amino, nitro, thiol, aryl, and cyano groups.

Examples of the aromatic polycarboxylic acid having a valence of 3 or more for forming Y include $C_9$ to $C_{30}$ aromatic polycarboxylic acids, for example, tricarboxylic acids such as trimellitic acid, 1,2,3-benzene tricarboxylic acid, trimesic acid, hemimellitic acid, 1,2,4-, 1,3,6-, or 2,3,6-naphthalene tricarboxylic acid, and 2,3,6-anthracene tricarboxylic acid; and tetracarboxylic acids such as pyromellitic acid, 3,3',4,4'-benzophenone tetracarboxylic acid, 2,2',3,3'-benzophenone tetracarboxylic acid, 2,3,3',4'-benzophenone tetracarboxylic acid, 3,3',4,4'-biphenyl tetracarboxylic acid, 2,2',3,3'-biphenyl tetracarboxylic acid, 2,3,3',4'-biphenyl tetracarboxylic acid, 4,4'-oxybis phthalic acid, diphenylmethane tetracarboxylic acid, 1,4,5,8-naphthalene tetracarboxylic acid, 1,2,5,6-naphthalene tetracarboxylic acid, 2,3,6,7-naphthalene tetracarboxylic acid, and 4,4'-(hexafluoroisopropylidene) bisphthalic acid. One kind of the aromatic polycarboxylic acid may be used alone, or two or more kinds thereof may be used in combination.

For production of the compound (S), ester-forming derivatives thereof may be used, such as acid anhydride, lower alkyl (having 1 to 4 carbon atoms) ester (e.g., methyl ester, ethyl ester, and isopropyl ester), and acid halide (e.g., acid chlorides).

From the viewpoint of waterproofness and resistance to washing, preferable among the aromatic polycarboxylic acids are those having a structure in which carboxyl groups are respectively bound to two carbon atoms, which form the aromatic ring and are positioned adjacent to the carbon atom having no substituent among the carbon atoms forming the aromatic ring. More preferably, a carboxyl group or groups is/are further bound to either one or both of carbon atoms that are adjacent to the carbon atoms each bound to a carboxyl group.

For example, in the case where the aromatic ring of the aromatic polycarboxylic acid is a benzene ring, the benzene ring preferably has a structure in which carboxyl groups are bound to carbon atoms of the first and third positions, and more preferably, in addition to the carboxyl groups, a carboxyl group or groups is/are further bound to the either one or both of carbon atoms of the fourth and sixth positions.

From the viewpoint of waterproofness and resistance to washing, the aromatic polycarboxylic acid for forming Y is particularly preferably a monocyclic compound, and most preferably trimellitic acid or pyromellitic acid.

In the formula (1), a represents an integer of not smaller than 1; b represents an integer of not smaller than 0; and a and b satisfy the inequality: $2 \leq a+b \leq d-2$, wherein d represents the number of hydrogen atoms bound to the carbon atoms forming the aromatic ring of the aromatic polycarboxylic acid when all of substituents including a carboxyl group in the aromatic polycarboxylic acid are substituted by hydrogen atoms, i.e., the number of substitutable sites on the aromatic ring. For example, if the aromatic ring is a benzene ring consisting of six carbon atoms, d is 6, and a+b may be an integer from 2 to 4. If the aromatic ring is a naphthalene ring consisting of 10 carbon atoms, d is 8, and a+b may be an integer from 2 to 6. If the aromatic ring is monocyclic, from the viewpoint of waterproofness and resistance to washing, a+b is preferably 2 or 3. Moreover, from the viewpoint of waterproofness and resistance to washing, b is preferably an integer of not more than a half of a, and particularly preferably 0.

The compound (S) of the present invention preferably has a hydroxyl value of 0, or 70 to 500 mg KOH/g from the viewpoint of waterproofness and texture.

The compound (S1) has a hydroxyl value of preferably 70 to 500 mg KOH/g, and more preferably 75 to 350 mg KOH/g. If the compound (S1) has a hydroxyl value of less than 70 mg KOH/g, the polyurethane resin tends to have low waterproofness. If it has a hydroxyl value of more than 500 mg KOH/g, the polyurethane resin tends to have inferior texture.

The compound (S2) has a hydroxyl value of 0.

The concentration of Y in the compound (S) means the amount (in mmol) of the residue Y in one gram of the compound (S), and it is preferably 1.0 to 6.0 mmol/g, and more preferably 1.1 to 3.5 mmol/g from the viewpoint of the waterproofness and resistance to washing of the polyurethane resin. If the compound (S) includes the residue Y at a concentration of less than 1.0 mmol/g, the polyurethane resin tends to have low waterproofness. If it includes the residue Y at a concentration of more than 6.0 mmol/g, the polyurethane resin may have inferior texture.

The carbonyl group concentration in the compound (S) means the amount (in mmol) of the carbonyl group in one gram of the compound (S), and it is preferably 3.0 to 20 mmol/g, and more preferably 3.3 to 11 mmol/g from the viewpoint of the waterproofness and resistance to washing of the polyurethane resin. If the compound (S) has a carbonyl group concentration of less than 3.0 mmol/g, the polyurethane resin tends to have low waterproofness. If it has a carbonyl group concentration of more than 20 mmol/g, the texture may be deteriorated.

The compound (S) has a molar average number of functional groups of preferably 0 to 8, more preferably 2 to 6, and particularly preferably 2 to 4 from the viewpoint of the waterproofness of the polyurethane resin.

The molar average number of functional groups according to the present invention is a value obtained by multiplying the number of active hydrogen-containing functional groups of a component by the number of moles of the component to give a product, summing up the products for all the components in a composition, and then dividing the total value by a sum of the numbers of moles of all the components. The number of moles of each component is a value obtained by dividing the weight of each component by the molecular weight of the component. The molecular weight for the calculation is the chemical formula weight if the component has no molecular weight distribution as in the case of low molecular weight compounds. The molecular weight for the calculation is the number average molecular weight (hereinafter abbreviated as Mn) if the component has a molecular weight distribution. The Mn values of the compound (S) and polyol in the present invention are measured by gel permeation chromatography (GPC) using THF as a solvent and polyoxypropylene glycol as a standard. For the measurement, the concentration of samples is 0.25% by weight, the column stationary phase is a combination of a TSKgel Super H2000, a TSKgel Super H3000, and a TSKgel Super H4000 (all produced by TOSOH Corporation), and the column temperature is 40° C.

The compound (S1) containing at least one active hydrogen atom to be incorporated into the polyurethane resin (U) skeleton is a compound represented by the formula (1) in which at least one of $X^1$, $X^2$ and Y has an active hydrogen atom. Specifically, the compound (S1) contains at least one active hydrogen atom in at least one of the following conditions: the valences m and c of $X^1$ satisfy m>c; Y is replaced by a substituent having an active hydrogen atom, such as an amino group, a hydroxyl group, a hydroxyamino group, and a thiol group; the active hydrogen-containing compound forming $X^2$ is a di- or higher valent compound; or b is an integer of not less than 1.

The amount of the compound (S1) to be incorporated into the skeleton of the polyurethane resin (U) is preferably 0.01 to 10% by weight, and more preferably 0.02 to 5% by weight based on a total weight of the active hydrogen component (A1) and organic polyisocyanate component (B) from the viewpoint of waterproofness and resistance to washing.

Examples of the oxyethylene group-containing high molecular weight diol (a1) in the present invention include EO adducts of the $C_2$-$C_{20}$ polyhydric alcohols (e.g., polyoxyethylene glycol), polyadducts of EO and other AO, and EO adducts of other high molecular weight diol (a2) mentioned below.

Examples of other AO include PO, 1,2-, 1,3- or 2,3-buthyrene oxide, and THF, and a combination of two or more of these.

A method of adding EO to other AO may be random addition or block addition, or may be a combination of these methods.

Preferable among these from the viewpoint of moisture permeability are polyoxyethylene glycol, and polyadducts of EO and other AO to $C_2$-$C_{20}$ dihydric alcohol; more preferably polyoxyethylene glycol, and random polyadducts of EO and PO to propylene glycol or ethylene glycol; and most preferably polyoxyethylene glycol. One kind of the oxyethylene group-containing high molecular weight diol (a1) may be used alone, or two or more kinds thereof may be used in combination.

The oxyethylene group-containing high molecular weight diol (a1) has a hydroxyl value of preferably 2 to 150 mg KOH/g, and more preferably 5 to 70 mg KOH/g from the viewpoint of waterproofness and texture. If the oxyethylene group-containing high molecular weight diol (a1) has a hydroxyl value of less than 2 mg KOH/g, the polyurethane resin tends to have low waterproofness. If it has a hydroxyl value of more than 150 mg KOH/g, the polyurethane resin may have inferior texture.

The amount of the oxyethylene group to be introduced into the polyurethane resin (U) by the oxyethylene group-containing high molecular weight diol (a1) is preferably 20 to 80% by weight, and more preferably 30 to 60% by weight based on the weight of the polyurethane resin (U) from the viewpoint of moisture permeability and resistance to washing. If the amount is less than 20% by weight, the moisture permeability tends to decrease. If the amount is more than 80% by weight, the resistance to washing tends to decrease.

The active hydrogen component (A1) may further contain other high molecular weight diol (a2) as long as the moisture permeability of the polyurethane resin (U) is not deteriorated.

Examples of other high molecular weight diol (a2) include polyether diol and polyester diol.

Examples of the polyether diol include polyoxypropylene glycol, polyoxytetramethylene glycol, polyoxypropylene/polyoxytetramethylene block copolymer diol.

Examples of the polyester diol include condensed polyester diol, polylactone diol, and polycarbonate diol.

The condensed polyester diol is obtainable by reacting the $C_2$-$C_{20}$ dihydric alcohol with a $C_2$-$C_{20}$ dicarboxylic acid.

Examples of the $C_2$-$C_{20}$ dicarboxylic acid include aliphatic dicarboxylic acids (e.g., succinic acid, adipic acid, and sebacic acid), aromatic dicarboxylic acids (e.g., terephthalic acid and isophthalic acid), and mixtures of two or more kinds thereof.

Specific examples of the condensed polyester diol include polyethylene adipate diol, polybutylene adipate diol, poly hexamethylene adipate diol, polyhexamethylene isophthalate diol, polyneopentyl adipate diol, polyethylene propylene adipate diol, polyethylene buthylene adipate diol, polybutylene hexamethylene adipate diol, polydiethylene adipate diol, poly(polytetramethylene ether)adipate diol, poly(3-methyl pentylene adipate)diol, polyethylene azelate diol, polyethylene sebacate diol, polybutylene azelate diol, polybutylene sebacate diol, and polyneopentyl terephthalate diol.

The polylactone diol is a polyadduct of lactone to the $C_2$-$C_{20}$ dihydric alcohol. Examples of the lactone include $C_4$-$C_{12}$ lactones (e.g., γ-butyrolactone, γ-valerolactone, and ε-caprolactone).

Specific examples of the polylactone polyol include polycaprolactone diol, polyvalerolactone diol, and polycaprolactone triol.

Examples of the polycarbonate diol include polycarbonate polyols produced by condensation through dealcoholization reaction of the $C_2$-$C_{20}$ dihydric alcohol and a low molecular weight carbonate compound (e.g., dialkyl carbonates containing $C_1$-$C_6$ alkyl groups, alkylene carbonates containing $C_2$-$C_6$ alkylene groups, and diaryl carbonates containing $C_6$-$C_9$ aryl groups). Each of the $C_2$-$C_{20}$ dihydric alcohol and the low molecular weight carbonate compound may be used in a combination of two or more kinds thereof.

Specific examples of the polycarbonate polyols include polyhexamethylene carbonate diols, polypentamethylene carbonate diols, polytetramethylene carbonate diols, and poly(tetramethylene/hexamethylene)carbonate diols (e.g., diols produced by condensation through dealcoholization reaction of 1,4-butanediol and 1,6-hexanediol with dialkyl carbonate).

The other high molecular weight diol (a2) has a hydroxyl value of preferably 2 to 150 mg KOH/g, and more preferably 5 to 70 mg KOH/g from the viewpoint of waterproofness and texture. If the high molecular weight diol (a2) has a hydroxyl value of less than 2 mg KOH/g, the polyurethane resin tends to have low waterproofness. If it has a hydroxyl value of more than 150 mg KOH/g, the polyurethane resin tends to have inferior texture.

The active hydrogen component (A1) may further contain a chain extender (a3) and a reaction terminator (a4). Examples of the chain extender (a3) include water, the $C_2$-$C_{20}$ polyhydric alcohol, $C_2$-$C_{10}$ diamines (e.g., ethylenediamine, propylene diamine, 1,6-hexane diamine, isophorone diamine, toluene diamine and piperazine), polyalkylene polyamines (e.g., diethylene triamine, and triethylene tetramine), hydrazines and derivatives thereof (e.g., dibasic acid dihydrazide such as adipic acid dihydrazide), and $C_2$-$C_{10}$ amino alcohols (e.g., ethanol amine, diethanolamine, 2-amino-2-methyl propanol, and triethanolamine). One kind of the chain extender may be used alone, or two or more kinds thereof may be used in combination.

Examples of the reaction terminator (a4) include $C_1$-$C_8$ monoalcohols (e.g., methanol, ethanol, isopropanol, n-butanol, cellosolves, and carbitols) and $C_1$-$C_{10}$ monoamines (e.g., mono- or di-alkylamines, such as monomethylamine, monoethylamine, monobutylamine, dibutylamine, and monooctylamine; mono- or di-alkanolamines, such as monoethanolamine, diethanolamine, and diisopropanolamine). One kind of the reaction terminator may be used alone, or two or more kinds thereof may be used in combination.

Any organic polyisocyanate which is usually used for production of polyurethane resins may be used as the organic polyisocyanate component (B) in the present invention. Examples thereof include an aromatic polyisocyanate, an aliphatic polyisocyanate, an alicyclic polyisocyanate, an araliphatic polyisocyanate, and modified compounds thereof (urethane group-, carbodiimide group-, allophanate group-, urea group-, biuret group-, isocyanurate group- and oxazolidone group-containing modified polyisocyanates and the like). One kind of the polyisocyanate component (B) may be used alone, or two or more kinds thereof may be used in combination.

Examples of the aromatic polyisocyanate include $C_6$-$C_{16}$ (excluding carbon atoms in an NCO group; the same shall apply to the following polyisocyanates) aromatic diisocyanates, $C_6$-$C_{20}$ aromatic triisocyanates, and crude compounds of these isocyanates. Specific examples thereof include 1,3- or 1,4-phenylene diisocyanate, 2,4- or 2,6-tolylene diisocyanate (hereinafter abbreviated as TDI), crude TDI, 2,4'- or 4,4'-diphenylmethane diisocyanate (hereinafter abbreviated as MDI), polymethylene-polyphenylene polyisocyanate (hereinafter abbreviated as crude MDI), naphthylene-1,5-diisocyanate, and triphenylmethane-4,4',4"-triisocyanate.

Examples of the aliphatic polyisocyanate include $C_6$ to $C_{10}$ aliphatic diisocyanate, such as 1,6-hexamethylene diisocyanate, 2,2,4-trimethyl hexamethylene diisocyanate, and lysine diisocyanate.

Examples of the alicyclic polyisocyanate include $C_6$ to $C_{16}$ alicyclic diisocyanate, such as isophorone diisocyanate, 4,4'-dicyclohexylmethane diisocyanate, 1,4-cyclohexane diisocyanate, and norbornane diisocyanate.

Examples of the araliphatic isocyanate include $C_8$ to $C_{12}$ araliphatic diisocyanate, such as xylylene diisocyanate and α,α,α,α'-tetramethylxylylene diisocyanate.

Specific examples of the modified polyisocyanates include carbodiimide-modified MDI.

Among these, an aromatic polyisocyanate is preferable; and TDI, crude TDI, MDI, crude MDI and modified compounds of these isocyanates are more preferable from the viewpoint of tensile strength. Particularly preferably, MDI, crude MDI, and modified compounds of these isocyanates are contained in a total amount of not less than 10% by weight (in particular 15 to 80% by weight). The isocyanate group content (NCO %) in the entire organic polyisocyanate component (B) is preferably 25 to 45% by weight.

The polyurethane resin (U) for moisture-permeable waterproof materials according to the present invention has a weight average molecular weight (Mw) of preferably 50,000 to 1,000,000, and more preferably 100,000 to 500,000 from the viewpoint of enhancement in the tensile strength.

In the present invention, the Mw of the polyurethane resin is measured by gel permeation chromatography (GPC) using dimethylformamide (hereinafter abbreviated as DMF) as a solvent and polystyrene as a standard. For the measurement, the concentration of samples is 0.25% by weight, the column stationary phase is a combination of a TSKgel Super H2000, a TSKgel Super H3000, and a TSKgel Super H4000 (all produced by TOSOH Corporation), and the column temperature is 40° C.

The polyurethane resin for moisture-permeable waterproof materials according to the present invention is produced by any method, and may be produced by known methods or other methods. For example, the active hydrogen component (A1), the polyisocyanate component (B), and optionally an organic solvent and an additive may be introduced all together for a reaction. Alternatively, the active hydrogen component (A1) is reacted with the polyisocyanate component (B) to obtain a prepolymer having terminal isocyanate groups, and then a chain extension reaction is caused by the chain extender. Moreover, the reaction may be performed by use of a kneader or the like as a reaction device without any solvent.

Any polyurethane resin may be used for the polyurethane resin composition (W) as long as it contains the oxyethylene group-containing high molecular weight diol (a1) as a structural unit of the resin molecule. The polyurethane resin may or may not contain the compound (S1) as a component of the molecule. Examples of the polyurethane resin include those obtainable by reacting the following: an active hydrogen component (A2) containing the oxyethylene group-containing high molecular weight diol (a1) and optionally containing the above-mentioned other high molecular weight diol (a2), chain extender (a3) reaction terminator (a4), and compound (S1); and the organic polyisocyanate component (B).

If the compound (S) is added to the polyurethane resin, the amount to be added is preferably 0.01 to 10% by weight, and more preferably 0.02 to 5% by weight based on the weight of the polyurethane resin.

During the production of the polyurethane resin composition (W), the polyurethane resin and the compound (S) may be added at any time. The compound (S) may be added after producing the polyurethane resin. In the case where the compound (S) is the compound (S2) containing no active hydrogen atom, the polyurethane resin may be produced in the presence of the compound (S2).

The preferable range of the oxyethylene group content in the polyurethane resin to be contained in the polyurethane resin composition (W) is the same as or similar to the preferable range in the case of the polyurethane resin (U).

The polyurethane resin (U) for moisture-permeable waterproof materials according to the present invention, which is optionally mixed with an organic solvent, may be used as an organic solvent solution. The polyurethane resin composition (W) of the present invention may optionally contain an organic solvent.

Examples of the organic solvent include solvents containing no active hydrogen group, and specific examples thereof include amide-type solvents (e.g. DMF, N,N-dimethylacetamide, N-methylpyrrolidone), sulfoxide-type solvents (e.g., dimethyl sulfoxide), ketone-type solvents (e.g., methyl ethyl ketone, methyl isobutyl ketone), ether-type solvents (e.g., dioxane, THF), ester-type solvents (e.g., methyl acetate, ethyl acetate, butyl acetate), and aromatic-type solvents (e.g., toluene, xylene). One kind of the organic solvent may be used alone, or two or more kinds thereof may be used in combination.

The polyurethane resin (U) of the present invention may be used after optionally mixed with a pigment, a stabilizer, or other additives. The polyurethane resin composition (W) of the present invention may optionally contain a pigment, a stabilizer, or other additives.

Any known organic pigments and/or inorganic pigments may be used as a pigment. The amount of the pigment to be added is usually 0 to 5% by weight, and preferably 0.1 to 3% by weight relative to the polyurethane resin. Examples of the organic pigments include insoluble azo pigments, soluble azo pigments, copper phthalocyanine pigments, and quinacridone pigments. Examples of the inorganic pigments include chromate salts, ferrocyanide compounds, metal oxides, selenium sulfide compounds, metal salts (e.g., sulfate, silicate, carbonate, phosphate), metal powders, and carbon black.

Any stabilizer may be used, and known antioxidants and/or ultraviolet absorbers may be used as a stabilizer. The amount of the stabilizer is usually 0 to 5% by weight, and preferably 0.1 to 3% by weight relative to the polyurethane resin.

Examples of the antioxidants include phenol-type antioxidants (e.g., 2,6-di-t-butyl-p-crezol, butylated hydroxy anisole); bisphenol-type antioxidants (e.g., 2,2'-methylene bis(4-methyl-6-t-butyl phenol)); and phosphorus-type antioxidants (e.g., triphenyl phosphite, diphenyl isodecyl phosphite).

Examples of the ultraviolet absorbers include benzophenone-type ultraviolet absorbers (e.g. 2,4-dihydroxy benzophenone, 2-hydroxy-4-methoxy benzophenone); benzotriazole-type ultraviolet absorbers (e.g. 2-(2'-hydroxy-5'-methyl phenyl)benzotriazole); salicylate-type ultraviolet absorbers (e.g. phenylsalicylate); and hindered amine-type ultraviolet absorbers (e.g. bis(2,2,6,6-tetramethyl-4-piperiridyl)sebacate). Examples of other additives include fusion inhibitors and flame retardants.

The pigment, stabilizer, and other additive may be added at any stage during the production of the polyurethane resin, or after the production. Moreover, in the case where the polyurethane resin composition (W) contains the pigment, stabilizer, or other additives, such an additive may be added at any stage during the production of the polyurethane resin, or after the production.

The polyurethane resin (U) and polyurethane resin composition (W) of the present invention each are used as a polyurethane resin layer of a moisture-permeable waterproof material, which is a composite material including a fiber material and a polyurethane resin layer provided on at least one surface of the fiber material.

The base materials of the fiber material may be any of cellulose fibers such as cotton, linen, and rayon; and synthetic fibers such as polyester, polyamide, and polyolefin. The fiber material may be in any form of fabric, such as woven, knitted, and nonwoven fabrics, and is preferably a woven or knitted fabric.

The moisture-permeable waterproof material including the polyurethane resin (U) or polyurethane resin composition (W) of the present invention is favorably used for wears for outdoor activities such as fishing and mountain climbing, skiing wears, wind breakers, athletic wears, golf wears, rain wears, casual coats, outdoor work wears, gloves, shoes, and mountaineering equipment such as tents, or the like.

EXAMPLES

The present invention will be described in more detail below based on examples which, however, are not intended to limit the present invention. Hereinafter, the term "parts" means "parts by weight."

Production Example 1

Production of Compound (S1-1)

A PO/EO block adduct of propylene glycol (900 parts, "SANNIX PL-910" produced by Sanyo Chemical Industries, Ltd., Mn: 900, hydroxyl value: 124.7), 384 parts of trimellitic anhydride, and 1.0 part of an alkali catalyst (N-ethylmorpholine) were charged into a stainless steel autoclave equipped with a stirrer and a temperature controller. They were reacted under a nitrogen atmosphere at 0.20 MPa and 130±10° C. for 5 hours for half esterification of the acid anhydride functional group to give an ester compound in which 2 moles of the trimellitic anhydride was reacted with 1 mole of the PO/EO block adduct of propylene glycol. Subsequently, 198 parts of EO was added dropwise over 5 hours while controlling the pressure to 0.50 MPa or less at 100±10° C., followed by aging at 100±10° C. for 1 hour. In this manner, a compound (S1-1) in which EO was added to the carboxyl groups of the ester compound was obtained.

Production Example 2

Production of Compound (S1-2)

A compound (S1-2) was obtained in the same manner as in Production Example 1, except that 1000 parts of polyoxytetramethylene glycol ("PTMG1000" produced by Mitsubishi Chemical Corporation, Mn: 1000, hydroxyl value: 112.2) was used instead of the 900 parts of the PO/EO block adduct of propylene glycol.

Production Example 3

Production of Compound (S1-3)

A compound (S1-3) was obtained in the same manner as in Production Example 1, except that 1500 parts of polyoxypropylene trial ("SANNIX GP-1500" produced by Sanyo Chemical Industries, Ltd., Mn: 1500, hydroxyl value: 112.2) was used instead of the 900 parts of PO/EO block adduct of propylene glycol; and the amounts of trimellitic anhydride and 80 charged were changed to 576 parts and 299 parts, respectively.

Production Example 4

Production of Compound (S1-4)

A compound (S1-4) was obtained in the same manner as in Production Example 1, except that 1000 parts of polyoxypropylene glycol ("SANNIX PP-1000" produced by Sanyo Chemical Industries, Ltd., Mn: 1000, hydroxyl value: 112.2) was used instead of the 900 parts of PO/EO block adduct of propylene glycol; and the amount of EO charged was changed to 101 parts.

Production Example 5

Production of Compound (S1-5)

A compound (S1-5) was obtained in the same manner as in Production Example 1, except that 1000 parts of polyoxyethylene glycol ("PEG-1000" produced by Sanyo Chemical Industries, Ltd., Mn: 1000, hydroxyl value: 112.2) was used instead of the 900 parts of PO/EO block adduct of propylene glycol.

Production Example 6

Production of Compound (S1-6)

A compound (S1-6) was obtained in the same manner as in Production Example 1, except that 200 parts of polyoxyethylene glycol ("PEG-200" produced by Sanyo Chemical Industries, Ltd., Mn: 200, hydroxyl value: 561.0) was used instead of the 900 parts of PO/EO block adduct of propylene glycol.

Production Example 7

Production of Compound (S1-7)

A compound (S1-7) was obtained in the same manner as in Production Example 1, except that 62 parts of ethylene glycol was used instead of the 900 parts of PO/EO block adduct of propylene glycol.

Production Example 8

Production of Compound (S1-8)

An amount of 116 parts of 1,6-hexane diamine, 384 parts of trimellitic anhydride, 1.0 part of an alkali catalyst (N-ethylmorpholine), and 246 parts of THF as a solvent were charged into a stainless steel autoclave equipped with a stirrer and a temperature controller. They were reacted under a nitrogen atmosphere at 80±10° C. for 2 hours for half amidation of the acid anhydride functional group to give an amide compound in which 2 moles of the trimellitic anhydride was reacted with 1 mole of the 1,6-hexane diamine. Subsequently, 198 parts of EO was added dropwise over 5 hours while controlling the pressure to 0.50 MPa or less at 80±10° C., followed by aging at 80±10° C. for 1 hour. Thereafter, the solvent was evaporated at 10 kPa at 80±10° C. In this manner, a compound (S1-8) in which EO was added to the carboxyl groups of the amide compound was obtained.

Production Example 9

Production of Compound (S1-9)

An amount of 150 parts of 1,6-hexane dithiol, 384 parts of trimellitic anhydride, 0.1 part of a ruthenium chloride (III) catalyst, and 246 parts of THF as a solvent were charged into a stainless steel autoclave equipped with a stirrer and a temperature controller. They were reacted under a nitrogen atmosphere at 50±10° C. for 2 hours for half thioesterification of the acid anhydride functional group to give a thioester compound in which 2 moles of the trimellitic anhydride was reacted with 1 mole of the 1,6-hexane dithiol. Subsequently, 198 parts of EO was added dropwise over 5 hours while controlling the pressure to 0.50 MPa or less at 80±10° C., followed by aging at 80±10° C. for 1 hour. Thereafter, the solvent was evaporated at 10 kPa at 80±10° C. In this manner, a compound (S1-9) in which EO was added to the carboxyl groups of the thioester compound was obtained.

Production Example 10

Production of Compound (S1-10)

A compound (S1-10) was obtained in the same manner as in Production Example 1, except that 400 parts of polyoxyethylene glycol ("PEG-200" produced by Sanyo Chemical Industries, Ltd., Mn: 200, hydroxyl value: 561.0) was used instead of the 900 parts of PO/EO block adduct of propylene glycol; 218 parts of pyromellitic anhydride was used instead of the 384 parts of trimellitic anhydride; and the amount of the EO charged was changed to 99 parts.

Production Example 11

Production of Compound (S1-11

A compound (S1-11) was obtained in the same manner as in Production Example 1, except that 484 parts of naphthalene-1,2,4-tricarboxylic acid-1,2-anhydride was used instead of the 384 parts of trimellitic anhydride.

Production Example 12

Production of Compound (S1-12)

An amount of 62 parts of ethylene glycol, 192 parts of trimellitic anhydride, and 1.0 part of an alkali catalyst (N-ethylmorpholine) were charged into a stainless steel autoclave equipped with a stirrer and a temperature controller. They were reacted under a nitrogen atmosphere at 0.20 MP and at 130±10° C. for 5 hours for half esterification of the acid anhydride functional group to give an ester compound in which 1 mole of the trimellitic anhydride was reacted with 1 mole of the ethylene glycol. Subsequently, 99 parts of EO was added dropwise over 5 hours while controlling the pressure to 0.50 MPa or less at 100±10° C., followed by aging at 100±10° C. for 1 hour. In this manner, a compound (S1-12) in which EO was added to the carboxyl groups of the ester compound was obtained.

Production Example 13

Production of Compound (S2-1)

A PO/EO block adduct of propylene glycol (900 parts, "SANNIX PL-910" produced by Sanyo Chemical Industries, Ltd., Mn: 900, hydroxyl value: 124.7), 384 parts of trimellitic anhydride, and 404 parts of triethylamine were charged into a stainless steel autoclave equipped with a stirrer and a temperature controller. They were reacted under a nitrogen atmosphere at 0.20 MPa and at 80±5° C. for 2 hours for half esterification of the acid anhydride functional group to give an ester compound in which 2 moles of the trimellitic anhydride was reacted with 1 mole of the PO/EO block adduct of propylene glycol. Next, 508 parts of benzyl chloride was further added, followed by reaction at 70±5° C. for 2 hours and subsequently separation of the liquid. In this manner, a compound (S2-1) in which the carboxyl groups of the ester compound were substituted by a benzyloxycarbonyl group was obtained.

Comparative Production Example 1

Production of Compound (S1'-1)

A polyol (S1'-1) was obtained in the same manner as in Production Example 1, except that 3200 parts of polyoxypropylene triol ("SANNIX GP-3000" produced by Sanyo Chemical Industries, Ltd., Mn: 3200, hydroxyl value: 52.6) was used instead of the 900 parts of PO/EO block adduct of propylene glycol; 444 parts of phthalic anhydride was used instead of the 384 parts of trimellitic anhydride; and the amount of EO charged was changed to 149 parts.

Comparative Production Example 2

Production of Compound (S1'-2)

A polyol (S1'-2) was obtained in the same manner as in Production Example 1, except that 296 parts of phthalic anhydride was used instead of the 384.0 parts of trimellitic anhydride; and the amount of the EO charged was changed to 99.0 parts.

Table 1 shows the results of analysis of the compounds obtained in Production Examples 1 to 13, and Comparative Production Examples 1 to 2.

TABLE 1

| | Compound (S) | Hydroxyl value (mgKOH/g) | Concentration of Y (mmol/g) | Carbonyl group concentration (mmol/g) | Molar average number of functional groups | Mn | In formula (1) a | b | c |
|---|---|---|---|---|---|---|---|---|---|
| Production Example 1 | (S1-1) | 151.4 | 1.3 | 4.0 | 4 | 1482 | 2 | 0 | 2 |
| Production Example 2 | (S1-2) | 141.8 | 1.3 | 3.8 | 4 | 1582 | 2 | 0 | 2 |
| Production Example 3 | (S1-3) | 141.7 | 1.3 | 3.8 | 6 | 2375 | 2 | 0 | 3 |
| Production Example 4 | (S1-4) | 151.1 | 1.3 | 4.0 | 4 | 1485 | 1 | 1 | 2 |
| Production Example 5 | (S1-5) | 141.8 | 1.3 | 3.8 | 4 | 1582 | 2 | 0 | 2 |
| Production Example 6 | (S1-6) | 287.0 | 2.6 | 7.7 | 4 | 782 | 2 | 0 | 2 |
| Production Example 7 | (S1-7) | 348.4 | 3.1 | 9.3 | 4 | 644 | 2 | 0 | 2 |
| Production Example 8 | (S1-8) | 321.5 | 2.9 | 5.7 | 4 | 698 | 2 | 0 | 2 |
| Production Example 9 | (S1-9) | 306.6 | 2.7 | 5.5 | 4 | 732 | 2 | 0 | 2 |
| Production Example 10 | (S1-10) | 313.0 | 1.4 | 5.6 | 4 | 717 | 3 | 0 | 1 |
| Production Example 11 | (S1-11) | 141.8 | 1.3 | 3.8 | 4 | 1582 | 2 | 0 | 2 |
| Production Example 12 | (S1-12) | 476.8 | 2.8 | 8.5 | 3 | 353 | 2 | 0 | 1 |
| Production Example 13 | (S2-1) | 0 | 3.6 | 3.6 | 0 | 1644 | 2 | 0 | 2 |
| Comparative Production Example 1 | (S1'-1) | 44.4 | 0.8 | 1.6 | 3 | 3793 | 1 | 0 | 3 |
| Comparative Production Example 2 | (S1'-2) | 86.6 | 1.5 | 3.1 | 2 | 1295 | 1 | 0 | 2 |

Examples 1 to 13 and Comparative Examples 1 to 3

According to the formulations shown in Table 2, a compound (S1) in an active hydrogen component (A1), a polyol (a1), a chain extender (a3), an organic polyisocyanate component (B), and a solvent were charged into a reactor. They were reacted under a dry nitrogen atmosphere at 70° C. for 12 hours, and then a reaction terminator (a4) was added thereto to perform end-terminating reaction for 1 hour. In this manner, solutions of the polyurethane resins (U-1) to (U-13) of the present invention and comparative solutions of polyurethane resins (U'-1) to (U'-3) were obtained.

TABLE 2

|  |  |  | Example 1 | Example 2 | Example 3 | Example 4 | Example 5 | Example 6 |
|---|---|---|---|---|---|---|---|---|
|  |  | Code of polyurethane resin | U-1 | U-2 | U-3 | U-4 | U-5 | U-6 |
| Active hydrogen component (A1) (parts) | Compound (S1) | Compound (S1-1) | 0.167 | — | — | — | — | — |
|  |  | Compound (S1-2) | — | 0.167 | — | — | — | — |
|  |  | Compound (S1-3) | — | — | 0.167 | — | — | — |
|  |  | Compound (S1-4) | — | — | — | 16.7 | — | — |
|  |  | Compound (S1-5) | — | — | — | — | 0.167 | — |
|  |  | Compound (S1-6) | — | — | — | — | — | 0.05 |
|  |  | Compound (S1-7) | — | — | — | — | — | — |
|  |  | Compound (S1-8) | — | — | — | — | — | — |
|  |  | Compound (S1-9) | — | — | — | — | — | — |
|  |  | Compound (S1-10) | — | — | — | — | — | — |
|  |  | Compound (S1-11) | — | — | — | — | — | — |
|  |  | Compound (S1-12) | — | — | — | — | — | — |
|  |  | Comparative polyol (S1'-1) | — | — | — | — | — | — |
|  |  | Comparative polyol (S1'-2) | — | — | — | — | — | — |
|  | Polyol (a1) | Polyoxyethylene glycol (Mn: 4000) | 200 | 200 | 200 | 200 | 200 | 200 |
|  | Chain extender (a3) | Ethylene glycol | 23.1 | 23.1 | 23.1 | 23.1 | 23.1 | 23.1 |
|  | Reaction terminator (a4) | n-Butanol | 5.6 | 5.6 | 5.6 | 5.6 | 5.6 | 5.6 |
| Organic polyisocyanate component (B) (parts) |  | MDI | 110 | 110 | 110 | 110 | 110 | 110 |
| Organic solvent (parts) |  | DMF | 777 | 777 | 777 | 777 | 777 | 777 |

|  |  |  | Example 7 | Example 8 | Example 9 | Example 10 | Example 11 |
|---|---|---|---|---|---|---|---|
|  |  | Code of polyurethane resin | U-7 | U-8 | U-9 | U-10 | U-11 |
| Active hydrogen component (A1) (parts) | Compound (S1) | Compound (S1-1) | — | — | — | — | — |
|  |  | Compound (S1-2) | — | — | — | — | — |
|  |  | Compound (S1-3) | — | — | — | — | — |
|  |  | Compound (S1-4) | — | — | — | — | — |
|  |  | Compound (S1-5) | — | — | — | — | — |
|  |  | Compound (S1-6) | — | — | — | — | — |
|  |  | Compound (S1-7) | 0.167 | — | — | — | — |
|  |  | Compound (S1-8) | — | 0.167 | — | — | — |
|  |  | Compound (S1-9) | — | — | 0.167 | — | — |
|  |  | Compound (S1-10) | — | — | — | 1.67 | — |
|  |  | Compound (S1-11) | — | — | — | — | 0.167 |
|  |  | Compound (S1-12) | — | — | — | — | — |
|  |  | Comparative polyol (S1'-1) | — | — | — | — | — |
|  |  | Comparative polyol (S1'-2) | — | — | — | — | — |
|  | Polyol (a1) | Polyoxyethylene glycol (Mn: 4000) | 200 | 200 | 200 | 200 | 200 |
|  | Chain extender (a3) | Ethylene glycol | 23.1 | 23.1 | 23.1 | 23.1 | 23.1 |
|  | Reaction terminator (a4) | n-Butanol | 5.6 | 5.6 | 5.6 | 5.6 | 5.6 |
| Organic polyisocyanate component (B) (parts) |  | MDI | 110 | 110 | 110 | 110 | 110 |
| Organic solvent (parts) |  | DMF | 777 | 777 | 777 | 777 | 777 |

|  |  |  | Example 12 | Example 13 | Comparative Example 1 | Comparative Example 2 | Comparative Example 3 |
|---|---|---|---|---|---|---|---|
|  |  | Code of polyurethane resin | U-12 | U-13 | U'-1 | U'-2 | U'-3 |
| Active hydrogen component (A1) (parts) | Compound (S1) | Compound (S1-1) | — | 16.9 | — | — | — |
|  |  | Compound (S1-2) | — | — | — | — | — |
|  |  | Compound (S1-3) | — | — | — | — | — |
|  |  | Compound (S1-4) | — | — | — | — | — |

TABLE 2-continued

|  |  |  |  |  |  |  |  |
|---|---|---|---|---|---|---|---|
|  |  | Compound (S1-5) | — | — | — | — | — |
|  |  | Compound (S1-6) | — | — | — | — | — |
|  |  | Compound (S1-7) | — | — | — | — | — |
|  |  | Compound (S1-8) | — | — | — | — | — |
|  |  | Compound (S1-9) | — | — | — | — | — |
|  |  | Compound (S1-10) | — | — | — | — | — |
|  |  | Compound (S1-11) | — | — | — | — | — |
|  |  | Compound (S1-12) | 0.167 | — | — | — | — |
|  |  | Comparative polyol (S1'-1) | — | — | — | 0.167 | — |
|  |  | Comparative polyol (S1'-2) | — | — | — | — | 0.167 |
|  | Polyol (a1) | Polyoxyethylene glycol (Mn: 4000) | 200 | 200 | 200 | 200 | 200 |
|  | Chain extender (a3) | Ethylene glycol | 23.1 | 23.1 | 23.1 | 23.1 | 23.1 |
|  | Reaction terminator (a4) | n-Butanol | 5.6 | 5.6 | 5.6 | 5.6 | 5.6 |
| Organic polyisocyanate component (B) (parts) |  | MDI | 110 | 110 | 110 | 110 | 110 |
| Organic solvent (parts) |  | DMF | 777 | 777 | 777 | 777 | 777 |

Examples 14 to 16 and Comparative Example 4

According to the formulations shown in Table 3, a polyol (a1) in an active hydrogen component (A2), a chain extender (a3), an organic polyisocyanate component (B), and a solvent were charged into a reactor. They were reacted under a dry nitrogen atmosphere at 70° C. for 12 hours, and then a reaction terminator (a4) was added thereto to perform end-terminating reaction for 1 hour. Thereafter, a compound (S) as an additive shown in Table 3 was added, followed by stirring at 60° C. for 15 minutes. In this manner, the polyurethane resin compositions (W–1) to (W–3) and a comparative polyurethane resin composition (W'-1) were obtained.

TABLE 3

|  |  |  | Example 14 | Example 15 | Example 16 | Comparative Example 4 |
|---|---|---|---|---|---|---|
| Code of polyurethane resin composition |  |  | W-1 | W-2 | W-3 | W'-1 |
| Active hydrogen component (A2) (parts) | Polyol (a1) | Polyoxyethylene glycol (Mn: 4000) | 200 | 200 | 200 | 200 |
|  | Chain extender (a3) | Ethylene glycol | 23.1 | 23.1 | 23.1 | 23.1 |
|  | Reaction terminator (a4) | n-Butanol | 5.6 | 5.6 | 5.6 | 5.6 |
| Organic polyisocyanate component (B) (parts) |  | MDI | 110 | 110 | 110 | 110 |
| Organic solvent (parts) |  | DMF | 777 | 777 | 777 | 777 |
| Compound (S) as an additive (parts) |  | Compound (S1-1) | 0.167 | — | 14.2 | — |
|  |  | Compound (S2-1) | — | 0.167 | — | — |
|  |  | Comparative compound (S1'-1) | — | — | — | 0.167 |

Table 4 shows the results of measurements or evaluations on the tensile strength, permanent set, moisture permeability, resistance to water pressure, and resistance to washing, and the compound (S) content and the amount of the compound (S) added, of the polyurethane resin solutions and the polyurethane resin compositions obtained in Examples 1 to 16 and Comparative Examples 1 to 4.

Meanwhile, the item "Compound (S1) content (%) in polyurethane resin" in Table 4 refers to the compound (S1) content (% by weight, excluding the compound (S1')) in the active hydrogen component (A1) based on the total weight of the active hydrogen component (A1) and the organic polyisocyanate component (B). The item "Compound (S) content (%) in polyurethane resin composition" refers to the compound (S) content (% by weight, excluding the comparative compound (S')) in the polyurethane resin composition based on the weight of the polyurethane resin when the compound (S) is added. The measurements and evaluations were performed by the following methods.

[1] Method of Measuring Tensile Strength

The polyurethane resin solution or polyurethane resin composition was applied in a thickness of 0.7 mm on a glass plate that had been release-treated, and dried at 70° C. for 3 hours in a circulating air dryer. The dried product was released from the glass plate to give a film for tensile strength test having a thickness of approximately 0.2 mm.

After the film for tensile strength test was allowed to stand in a room having a temperature of 25° C. and a humidity of 65% RH for 1 day, the tensile strength was measured in accordance with JIS K 6251.

[2] Method of Measuring Permanent Set

A test piece produced in the same manner as in the production of the film for tensile strength test was allowed to stand in a room having a temperature of 25° C. and a humidity of 65% RH for 1 day. The test piece was extended to 300% at a tensile speed of 50 cm/min. using an instron-type tensile testing machine (autograph from Shimadzu Corporation) at a temperature of 25° C., and the extended state was kept for 30 minutes. After returning to the initial state before extension at the same speed as the tensile speed, a distance ($L_5$) between marked lines of 30 minutes later was measured. Based on the distance ($L_5$) and a distance ($L_0$) between the marked lines before testing, the permanent set was determined from the following expression.

Permanent set (%)=$[1-(L_5-L_0)/L_0]\times100$

A smaller permanent set indicates better resistance to washing.

[3] Method of Measuring Moisture Permeability

The polyurethane resin solution or polyurethane resin composition was applied in a thickness of 25 μm on a glass plate that had been release-treated, and dried at 70° C. for 3 hours in a circulating air dryer. The dried product was released from the glass plate to give a film for moisture permeability test having a thickness of 7 μm.

The moisture permeability of the film for measuring moisture permeability was measured in accordance with JIS L-1099-1998 Calcium Chloride method (A-1).

[4] Method of Measuring Resistance to Water Pressure

Water resistance of a test piece produced in the same manner as in the production of the film for measuring moisture permeability was measured in accordance with JIS L1092-1998 Hydrostatic pressure method (Method B: High pressure method). In the case where the test piece extends due to the applied water pressure, the test piece was mounted on a tester after a nylon taffeta (density: warp+woof=210 threads/2.54 cm equivalent) was placed on the test piece, and then measurement was performed.

[5] Method of Evaluating Resistance to Washing

The polyurethane resin solution or polyurethane resin composition was applied in a thickness of 10 μm on a release paper using a bar coater, and then dried at 120° C. for 2 minutes in an air oven to form a surface layer.

Next, 100 parts of SANPRENE LQ-120 (produced by Sanyo Chemical Industries, Ltd.), 9 parts of Colonate HL (produced by Nippon Polyurethane Industry Co., Ltd.), and 0.02 parts of U-CAT SA102 (produced by San-Apro Ltd.) were mixed to prepare an adhesive layer resin solution. The solution was applied on the surface layer to have a thickness of 20 μm using a bar coater, and then dried at 120° C. for 2 minutes in an air oven to form an adhesive layer on the surface layer.

A polyester taffeta (83 decitex) was further laminated over the adhesive layer, and pressured-bonded at 1 MPa at 120° C. for 20 seconds using a thermo-presser (Tabletop test press SA-302, produced by Tester Sangyo Co., Ltd.) to prepare a moisture-permeable waterproof fabric.

The moisture-permeable waterproof fabric was washed in accordance with JIS L0217-103 method, and change in the external appearance was evaluated. Fabrics with no changes in the external appearance were evaluated as "Good", and those with wrinkles or floatings were evaluated as "Poor."

TABLE 4

|  |  | Example 1 | Example 2 | Example 3 | Example 4 | Example 5 |
|---|---|---|---|---|---|---|
| Code of polyurethane resin or polyurethane resin composition | | U-1 | U-2 | U-3 | U-4 | U-5 |
| Tensile test | Tensile strength (MPa) | 88 | 86 | 80 | 80 | 85 |
|  | Permanent set (%) | 13 | 14 | 12 | 17 | 14 |
| Moisture permeability test and Water pressure resistance test | Film thickness (μm) | 7 | 7 | 7 | 7 | 7 |
|  | Moisture permeability (g/m² · 24 h) | 11800 | 11500 | 10700 | 10200 | 12000 |
|  | Resistance to water pressure (mmH₂O) | 30000 or more | 30000 or more | 26000 | 24000 | 30000 or more |
| Resistance to washing test on fabric | Resistance to washing | Good | Good | Good | Good | Good |
| Oxyethylene group content (%) in polyurethane resin | | 60 | 60 | 60 | 60 | 60 |
| Compound (S1) content (%) in polyurethane resin | | 0.05 | 0.05 | 0.05 | 4.7 | 0.05 |
| Compound (S) content (%) in polyurethane resin composition | | 0 | 0 | 0 | 0 | 0 |

|  |  | Example 6 | Example 7 | Example 8 | Example 9 | Example 10 |
|---|---|---|---|---|---|---|
| Code of polyurethane resin or polyurethane resin composition | | U-6 | U-7 | U-8 | U-9 | U-10 |
| Tensile test | Tensile strength (MPa) | 84 | 76 | 83 | 78 | 81 |
|  | Permanent set (%) | 15 | 17 | 16 | 17 | 16 |
| Moisture permeability test and Water pressure resistance test | Film thickness (μm) | 7 | 7 | 7 | 7 | 7 |
|  | Moisture permeability (g/m² · 24 h) | 11600 | 10900 | 11000 | 11000 | 11000 |
|  | Resistance to water pressure (mmH₂O) | 30000 or more | 22000 | 30000 or more | 23000 | 28000 |
| Resistance to washing test on fabric | Resistance to washing | Good | Good | Good | Good | Good |
| Oxyethylene group content (%) in polyurethane resin | | 60 | 60 | 60 | 60 | 60 |
| Compound (S1) content (%) in polyurethane resin | | 0.015 | 0.05 | 0.05 | 0.05 | 0.47 |
| Compound (S) content (%) in polyurethane resin composition | | 0 | 0 | 0 | 0 | 0 |

|  |  | Example 11 | Example 12 | Example 13 | Example 14 | Example 15 |
|---|---|---|---|---|---|---|
| Code of polyurethane resin or polyurethane resin composition | | U-11 | U-12 | U-13 | W-1 | W-2 |
| Tensile test | Tensile strength (MPa) | 83 | 74 | 90 | 77 | 75 |
|  | Permanent set (%) | 16 | 18 | 13 | 16 | 17 |

TABLE 4-continued

|  |  |  |  |  |  |  |
|---|---|---|---|---|---|---|
| Moisture permeability test and Water pressure resistance test | Film thickness (μm) | 7 | 7 | 7 | 7 | 7 |
|  | Moisture permeability (g/m² · 24 h) | 10500 | 11100 | 10100 | 12000 | 11200 |
|  | Resistance to water pressure (mmH₂O) | 30000 or more | 20000 | 30000 or more | 23000 | 22000 |
| Resistance to washing test on fabric | Resistance to washing | Good | Good | Good | Good | Good |
| Oxyethylene group content (%) in polyurethane resin |  | 60 | 60 | 60 | 60 | 60 |
| Compound (S1) content (%) in polyurethane resin |  | 0.05 | 0.05 | 4.8 | 0 | 0 |
| Compound (S) content (%) in polyurethane resin composition |  | 0 | 0 | 0 | 0.05 | 0.05 |

|  |  | Example 16 | Comparative Example 1 | Comparative Example 2 | Comparative Example 3 | Comparative Example 4 |
|---|---|---|---|---|---|---|
| Code of polyurethane resin or polyurethane resin composition |  | W-3 | U'-1 | U'-2 | U'-3 | W'-1 |
| Tensile test | Tensile strength (MPa) | 80 | 68 | 64 | 69 | 62 |
|  | Permanent set (%) | 15 | 21 | 20 | 20 | 22 |
| Moisture permeability test and Water pressure resistance test | Film thickness (μm) | 7 | 7 | 7 | 7 | 7 |
|  | Moisture permeability (g/m² · 24 h) | 10200 | 11300 | 11000 | 11100 | 11200 |
|  | Resistance to water pressure (mmH₂O) | 30000 or more | 12000 | 10000 | 11000 | 8000 |
| Resistance to washing test on fabric | Resistance to washing | Good | Poor | Poor | Poor | Poor |
| Oxyethylene group content (%) in polyurethane resin |  | 60 | 60 | 60 | 60 | 60 |
| Compound (S1) content (%) in polyurethane resin |  | 0 | 0 | 0 | 0 | 0 |
| Compound (S) content (%) in polyurethane resin composition |  | 4.0 | 0 | 0 | 0 | 0 |

INDUSTRIAL APPLICABILITY

The polyurethane resin (U) for moisture-permeable waterproof materials and polyurethane resin composition (W) according to the present invention are excellent in all of the moisture permeability, waterproofness, and resistance to washing. Thus, they are especially useful for production of moisture-permeable waterproof materials for wears for outdoor activities such as fishing and mountain climbing, skiing wears, wind breakers, athletic wears, golf wears, rain wears, casual coats, outdoor work wears, gloves, shoes, and mountaineering equipment such as tents, or the like.

The invention claimed is:

1. A polyurethane resin (U) for moisture-permeable waterproof materials, obtained by reacting an active hydrogen component (A1) with an organic polyisocyanate component (B), wherein the active hydrogen component (A1) comprises an oxyethylene group-containing high molecular weight diol (a1), and a compound (S1) containing at least one active hydrogen atom of the following formula (1):

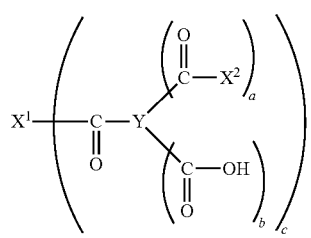

(1)

wherein $X^1$ represents a residue produced by removing c piece(s) of active hydrogen atom(s) from an active hydrogen-containing compound having a valence of m selected from the group consisting of $C_2$-$C_{20}$ polyhydric alcohols, polyether polyols obtained by adding alkylene oxide to $C_2$-$C_{20}$ polyhydric alcohols, $C_2$-$C_{20}$ aliphatic polyamines, and polyvalent thiol compounds, the c represents an integer satisfying the inequality: $1 \leq c \leq m$, and the m represents an integer of 2 to 20;

$X^2$ represents a residue produced by removing one piece of active hydrogen atom from an active hydrogen-containing compound selected from the group consisting of $C_2$-$C_{20}$ polyhydric alcohols, polyether polyols obtained by adding alkylene oxide to $C_2$-$C_{20}$ polyhydric alcohols, $C_2$-$C_{20}$ aliphatic polyamines, and polyvalent thiol compounds, and a plurality of $X^2$s may be the same as or different from one another;

$X^1$ and $X^2$ may be the same as or different from each other;

Y represents a residue produced by removing all of carboxyl groups from an aromatic polycarboxylic acid having a valence of 3 or more, wherein an aromatic ring in Y consists of carbon atoms, the carbon atoms are each optionally bound to a halogen atom and/or a substituent other than a carboxyl group, and at least one of the carbon atoms has no substituent;

a represents an integer of not smaller than 1;
b represents an integer of not smaller than 0; and
a and b satisfy the inequality: $2 \leq a+b \leq d-2$, wherein d represents the number of hydrogen atoms bound to the carbon atoms forming the aromatic ring of the aromatic polycarboxylic acid when all of substituents including a carboxyl group in the aromatic polycarboxylic acid are substituted by hydrogen atoms.

2. The polyurethane resin for moisture-permeable waterproof materials according to claim 1,
wherein the compound (S1) has a hydroxyl value of 70 to 500 mg KOH/g.

3. The polyurethane resin for moisture-permeable waterproof materials according to claim 1,
wherein the compound (S1) includes the residue Y at a concentration of 1.0 to 6.0 mmol/g.

4. The polyurethane resin for moisture-permeable waterproof materials according to claim 1,
wherein the compound (S1) has a carbonyl group concentration of 3.0 to 20 mmol/g.

5. The polyurethane resin for moisture-permeable waterproof materials according to claim 1,
wherein the aromatic polycarboxylic acid having a valence of 3 or more has a structure in which two carbon atoms adjacent to the carbon atom having no substituent in the aromatic ring are each bound to a carboxyl group.

6. The polyurethane resin for moisture-permeable waterproof materials according to claim 5,
wherein a carboxyl group or groups is/are further bound to either one or both of carbon atoms that are adjacent to the carbon atoms each bound to a carboxyl group.

7. The polyurethane resin for moisture-permeable waterproof materials according to claim 1,
wherein the aromatic polycarboxylic acid having a valence of 3 or more is at least one of trimellitic acid or pyromellitic acid.

8. The polyurethane resin for moisture-permeable waterproof materials according to claim 1,
wherein the active hydrogen component (A1) further contains a chain extender (a3) and a reaction terminator (a4).

9. The polyurethane resin for moisture-permeable waterproof materials according to claim 1,
wherein an amount of the compound (S1) based on the weight of the polyurethane resin is 0.01 to 10% by weight.

10. The polyurethane resin for moisture-permeable waterproof materials according to claim 1,
wherein an amount of the oxyethylene group in the polyurethane resin based on the weight of the polyurethane resin is 20 to 80% by weight.

* * * * *